(12) United States Patent
Ruettiger

(10) Patent No.: US 7,325,972 B2
(45) Date of Patent: Feb. 5, 2008

(54) METHOD FOR DETERMINING AN INTERIOR TEMPERATURE OF A PASSENGER AREA OF A MOTOR VEHICLE, ARRANGEMENT FOR EXECUTION OF THE METHOD, AND A TEMPERATURE SENSOR

(75) Inventor: Anton Ruettiger, Wildflecken (DE)

(73) Assignee: PREH GmbH, Sad Neustadt a.d. Saale (DE)

( * ) Notice: Subject to any disclaimer, the term of this patent is extended or adjusted under 35 U.S.C. 154(b) by 0 days.

(21) Appl. No.: 11/606,969

(22) Filed: Dec. 1, 2006

(65) Prior Publication Data

US 2007/0076781 A1    Apr. 5, 2007

Related U.S. Application Data

(62) Division of application No. 10/761,294, filed on Jan. 22, 2004, now Pat. No. 7,198,402.

(51) Int. Cl.
G01K 13/02 (2006.01)
G01K 17/06 (2006.01)
(52) U.S. Cl. .................. 374/141; 374/135; 374/29; 165/202; 236/91 R
(58) Field of Classification Search ............ 374/141, 374/142, 120, 121, 129, 131, 133, 135, 29, 374/208, 109; 236/12, 91 E, 91 C, 91 R; 73/866.5; 165/203, 205, 202
See application file for complete search history.

(56) References Cited

U.S. PATENT DOCUMENTS

| 4,434,932 A | 3/1984 | Hara et al. |
| 4,441,405 A | 4/1984 | Takeuchi |
| 5,220,805 A | 6/1993 | Fukudomi |
| 5,400,964 A | 3/1995 | Freiberger |
| 5,531,377 A | 7/1996 | Thayer et al. |
| 5,653,385 A | 8/1997 | Honda et al. |
| 5,704,544 A | 1/1998 | Samukawa et al. |
| 5,810,078 A | 9/1998 | Knutsson et al. |
| 5,860,593 A | 1/1999 | Heinle et al. |
| 6,070,650 A | 6/2000 | Inoue et al. |
| 6,155,492 A | 12/2000 | Hinterwaller et al. |
| 6,202,934 B1 | 3/2001 | Kamiya et al. |
| 6,550,686 B2 * | 4/2003 | Kawai et al. ............ 236/49.3 |
| 6,575,378 B2 | 6/2003 | Aoki et al. |
| 6,709,155 B2 | 3/2004 | Knittel et al. |
| 6,782,945 B1 * | 8/2004 | Eisenhour ............... 165/203 |
| 6,966,498 B2 | 11/2005 | Huang et al. |
| 2002/0048308 A1 * | 4/2002 | Knittel et al. ............ 374/141 |
| 2002/0125332 A1 | 9/2002 | Aoki et al. |
| 2004/0146085 A1 * | 7/2004 | Lindner et al. .......... 374/109 |

FOREIGN PATENT DOCUMENTS

DE    2048489    4/1971

(Continued)

Primary Examiner—Gail Verbitsky
(74) Attorney, Agent, or Firm—Geissler, Olds & Lowe PLLC

(57) ABSTRACT

A signal ($S_{normal}$) is provided to a heat element of a temperature sensor, which is recorded as a step response ($L_{ruh}$, $L_{bew}$). From the difference of the step response compared with the reaction adaptively determined with the temperature sensor at zero air circulation, air flow or no air flow is determined.

20 Claims, 4 Drawing Sheets

FOREIGN PATENT DOCUMENTS

| | | |
|---|---|---|
| DE | 4024431 A1 | 2/1991 |
| DE | 198 29 143 C1 | 7/1999 |
| DE | 197 28 803 C1 | 8/1999 |
| DE | 198 42 895 A1 | 3/2000 |
| DE | 100 16 419 A1 | 11/2001 |
| DE | 100 49 979 A1 | 4/2002 |
| DE | 100 19 103 C1 | 8/2002 |

* cited by examiner

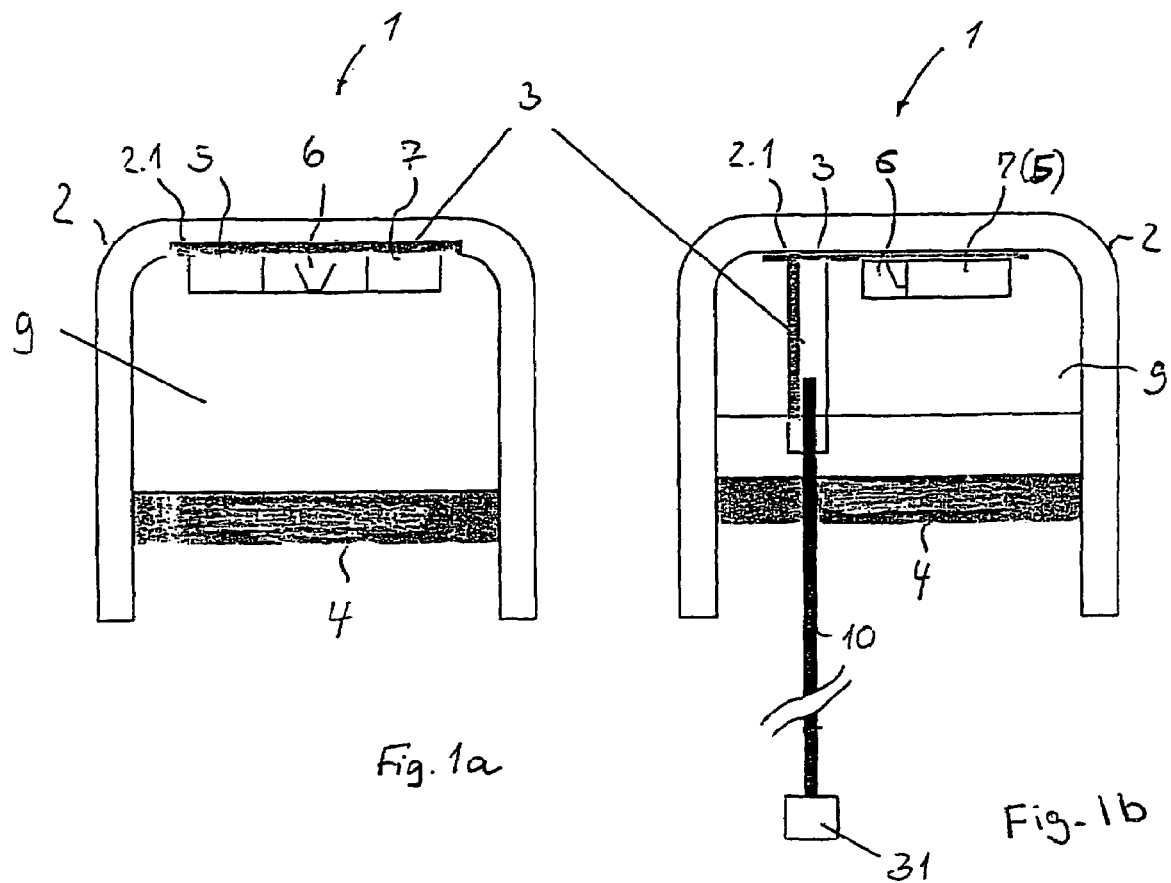
Fig. 1a
Fig. 1b
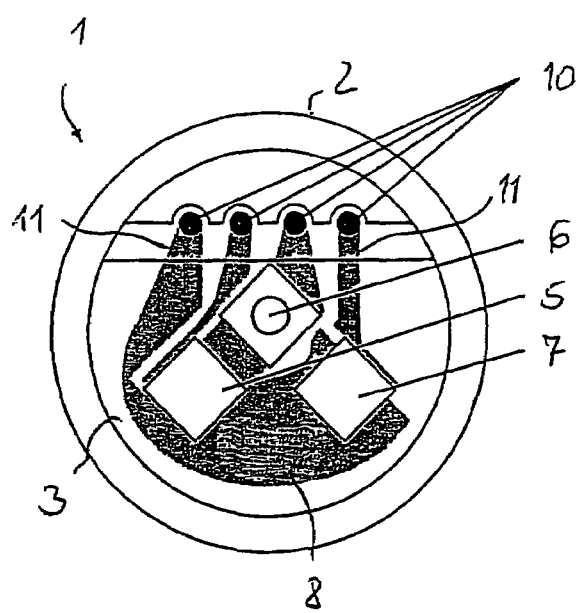
Fig. 1c

METHOD FOR DETERMINING AN INTERIOR TEMPERATURE OF A PASSENGER AREA OF A MOTOR VEHICLE, ARRANGEMENT FOR EXECUTION OF THE METHOD, AND A TEMPERATURE SENSOR

This is a divisional application under 37 C.F.R. § 1.53(b) of prior application Ser. No. 10/761,294 filed on Jan. 22, 2004 now U.S. Pat. No. 7,198,402, the entire contents of which are hereby incorporated by reference.

BACKGROUND OF THE INVENTION

1. Field of the Invention

The present invention relates to a method, an arrangement, and a temperature sensor in order to make a determination of the interior temperature of a vehicle, taking into consideration changing heat transmission resistance of a control element surface to the surrounding air flow.

2. Description of the Background Art

To automatically regulate the interior temperature in a motor vehicle it is necessary to know the actual interior temperature at a particular time point. As a rule, a control value is determined, which reflects the deviation of the actual interior temperature from the desired interior temperature. The control value serves to regulate the difference. Such a method is described in DE 40 24 431 A1, which is incorporated herein by reference.

In DE 198 29 143 C1, which is incorporated herein by reference, a further method for changing the interior temperature of a vehicle is disclosed. To compensate for changes in the actual value of the interior temperature due to exterior influences, for example low exterior temperature, an interior temperature-sensing element as well as an exterior sensor are provided. The interior temperature-sensing element is located in a control unit.

DE 197 28 803 C1, which is incorporated herein by reference, discloses an arrangement for measuring and/or regulating temperature with a housing, inside of which is a temperature-sensing element for measuring the interior temperature outside of the housing, whereby one or several heat sources are present inside and/or on the housing. Additionally, at least one auxiliary temperature-sensing element is provided inside the housing at an area where the temperature is more intensely influenced by the heat flow from the heat source than is the temperature at the temperature-sensing element.

A disadvantage of the solution just described is the big deviation of the measured temperature signals from the actual interior temperature due to the large amount of interferences with the sensor as well as the great inertness of the sensor, which detects changes in the interior temperature with a time delay and smoothed. Therefore, considerable effort to correct the temperature signals is required.

From DE 100 16 419 C2, which is incorporated herein by reference, a device for indirectly recording incident sun radiation in the interior of a vehicle is known. The photo sensor used is attached to a housing in such a way that it is not exposed directly to incident sun radiation and, therefore, only measures the radiation of the sun that is reflected and/or transmitted into the interior of the vehicle.

Presently, measuring methods are being developed, which measure the interior temperature directly on the surface of a control element without forced air circulation using a NTC (resistor with a negative temperature coefficient), e.g., a NTC thermistor. The unreliability of this measuring method is a result of the varying air circulation on the surface of the control element, which greatly relativizes the measurement values at the NTC, even when taking self-heating and the influence of the sun into consideration.

From DE 100 49 979 C2, which is incorporated herein by reference, a device for determining the temperature in the interior of a vehicle is known, whereby the temperature-sensing element is arranged behind a wall adjoining the interior. A heat-conducting element is provided to record the air temperature of the interior within the area close to its walls. The heat-conducting element is in heat conductivity contact with a temperature-sensing element and is attached to and/or close to the wall or in an opening in the wall. With this device, interference from partial sun radiation on the sensor housing is recorded and corrected accordingly.

SUMMARY OF THE INVENTION

It is therefore an object of the present invention to provide a method, an arrangement, and a temperature sensor in order to make a satisfactory determination of the interior temperature of, for example, a vehicle possible, taking into consideration changing heat transmission resistance of a control element surface to the surrounding air flow.

The invention is based on the knowledge that, for example in the case of incident sun radiation, a sensor measuring this radiation is heated up more without air circulation than with air circulation. The same effect occurs when measuring the temperature of the control element surface due to self-heating of the electronics. Here, too, measuring results are altered by air circulation. This air circulation in an interior of a vehicle can be produced by, for example, an operation of a heating and air-conditioning system of a vehicle or by the opening of a window while the vehicle is traveling.

To eliminate these alterations from the measuring results, the presence of moving or still air at a measuring area is determined, that is, the intensity of air circulation is determined. This information is weighted and is entered as a correction value into a control value of a setting in order to acquire an interior temperature of a vehicle, taking into consideration the heat transmission resistance of the control element surface to the surrounding air flow.

An important factor when putting this idea into practice is the configuration of the components to one another, in order to be able to determine the influence of air at the measurement area. Therefore, a heat element is directly temperature-coupled to a sensor, which, preferably, determines the temperature of the control element surface. The sensor is slightly heated with short pulses in relatively long time intervals by a heat element. From the difference of the step response in comparison with a reaction adaptively observed by the sensor at no air circulation, the influence of air flow can be determined and the interference values "warming of the control element" and in particular "sun" can be weighted. The correction signal resulting from the weighting is entered into the calculation of the control setting and the adjustment.

In a preferred embodiment, both components are integrated in a sensor housing, which is attached as an Incar-sensor on the surface of a temperature control element. The temperature sensor for the control element surface and the heat element are attached to a foil in the housing, which accomplishes the desired temperature coupling of both components. Furthermore, the sensor has an impulse-damping segment between the two components, which is formed by the foil and conducting tracks.

With the aid of the Incar-sensor thus constructed, the changing heat transmission resistances of the control element surface to the surrounding air flow can be directly determined.

In a further preferred embodiment, the Incar-sensor has, additionally or alternatively, to the heat element and the NTC, a solar, e.g., a light-sensitive sensor, which is used to determine incident sun radiation at the measuring area.

If, in addition, the self-heating of the control elements is to be taken into consideration, the NTC, which is preferably located in the regulating system, that is, in the control element electronics, can be used for measuring, whereby the integration of a further, separate NTC into the Incar-sensor is possible.

It is preferred that the Incar-sensor, e.g., temperature sensor, is manufactured using foil injection technology (the back of the foil is injection molded with synthetic materials) or MID (Molded Interconnect Devices) technology.

By using the Incar-sensor, a sensor ventilator is no longer needed, which eliminates known disadvantages like dirt accumulation and noise. Furthermore, it offers new possibilities for the design and construction of control elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 1a-c show the construction of an Incar-sensor using MID technology;

DETAILED DESCRIPTION

Figure 2A:
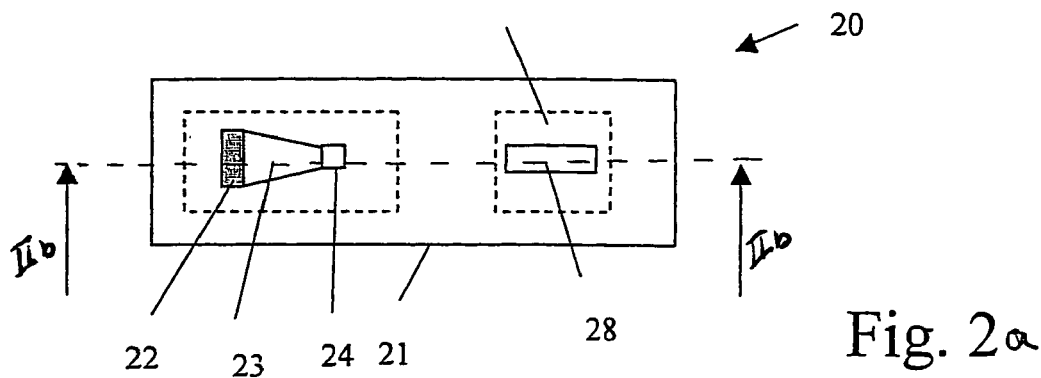
FIG. 2a is a top view of an Incar-sensor produced with foil technology.

In FIGS. 1a-c, a compact sensor 1, produced with MID technology, is illustrated in various views as an Incar-sensor or a temperature sensor. FIG. 1a shows the sensor in a front view, FIG. 1b in a side view, and FIG. 1c in a top view, each of which are cross-sectional views.

Sensor 1 has a housing 2, which in its top part has, for example, a foil 3, which functions as a substrate of the sensor 1. Towards its bottom, the housing 2 can be closed off with a casting compound 4. On foil 3, in a preferred embodiment, a heat element 5, for example a heat resistor, a solar sensor 6, for example a photo sensor, as well as a NTC element 7 are provided and are attached from the rear.

The foil 3 is made of PC (polycarbonate) or macrolon, for example. On the foil 3, located between the heat element 5 and the NTC 7, there are copper or silver tracks to create an impulse damping segment 8. In the housing 2, between the foil 3 and the components 5, 6, 7, and the casting compound 4, there is a heat insulation material 9, which also can be air, among other things. As illustrated in FIG. 1b in more detail, the electrical contact to a signal processing unit (not shown in detail) is made via contact pins 10. FIG. 1c illustrates the contact pins 10, which in turn are in electrical contact with the individual components 5-7 via conducting tracks 11.

FIG. 2a shows a top view of an Incar-sensor 20 made with foil technology. The sensor 20 illustrated therein preferably has a housing 21 with outer dimensions of, for example, 17×8×3 mm.

Figure 2B:
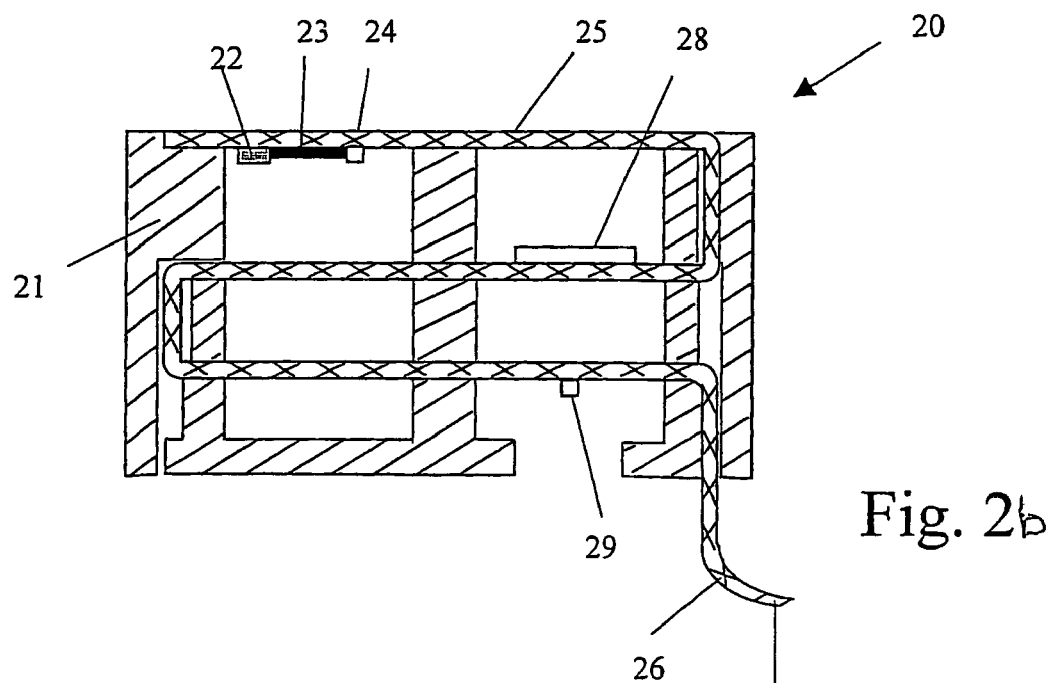
FIG. 2b is a sectional view IIb-IIb of the sensor of FIG. 2.
Figure 2C:
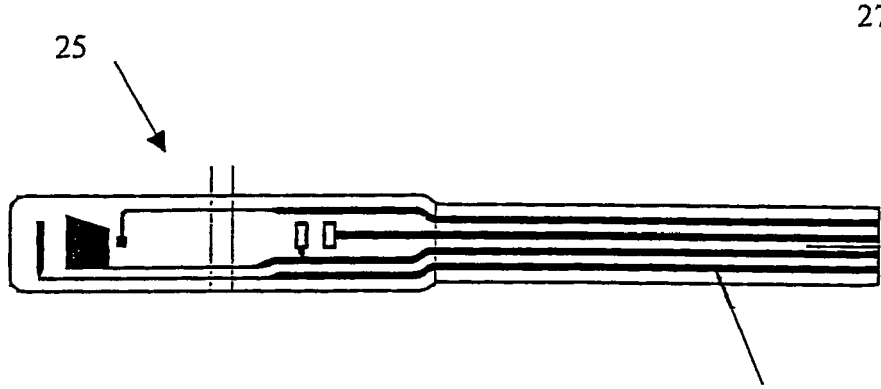
FIG. 2c is the foil of FIG. 2b in a top view.

FIG. 2b shows the sensor 20 of FIG. 2a in cross section IIb-IIb. This embodiment also has a heat element 22, an impulse-damping segment 23, and a NTC-element 24 integrated in a mutual housing 21 and a foil 25 being attached to the rear. The exceptional flexibility of the foil 25 allows a folding and/or bending of the foil 25 within the sensor housing 21. Through the folding of the foil 25, chambers are thus created.

Furthermore, in a preferred embodiment, the sensor 20 has a light-sensitive sensor 28, for example a photo sensor. The foil 25 is preferably IR (infrared) permeable, at least in the area of the photo sensor 28 that is located below the foil 25. A foil track 26 with a zero output plug 27 serves as contact to an evaluation unit (not shown in detail). It is also beneficial to attach an additional NTC 29 within the sensor housing 21. It can be used to determine the self-heating of the control element. The housing 21 is open at this area for this very purpose. Preferably, the housing 21 is constructed of multiple parts, which can be snapped together via, for example, latching projections.

Preferably, the sensor 20 is constructed as follows: The heat element 22 is directly attached to the foil 25 using thick film technology. The NTC 24 can then be either glued with conductive adhesive or soldered to the foil 25. The heat guide, e.g., impulse damping segment 23, is attached directly to the foil 25. As previously mentioned, the foil 25 can be made of polycarbonate or polyimide etc., which, preferably, has IR (infrared) light permeable areas. The foil 25 is then put into the sensor housing 21, preferably with adhesive and/or by injection molding. If the foil 25 is not made of IR-light permeable material, the foil 25 can alternatively be covered or replaced with an IR-light permeable varnish, either entirely or partially, but at least in the area of the photo sensor 28.

Figure 3:
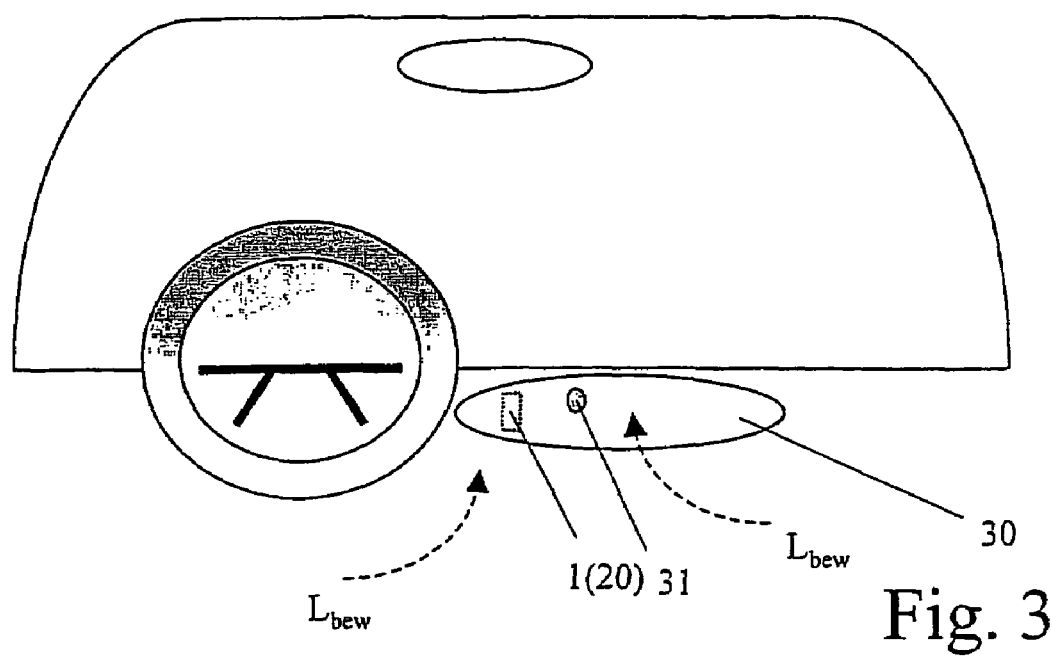
FIG. 3 is a top view of a control element with an Incar-sensor.

FIG. 3 is an illustration of a control element 30 in the interior of a motor vehicle (not shown in detail). Also illustrated is an NTC 31 that is located in the control element 30, and which can be used to determine the self-heating of the control element.

With the compact temperature sensor 1, 20, its upper part areaing to the interior, and with the aid of the solar sensor 6 and/or the light-sensitive sensor 28, the incident sun radiation at the measuring area/contact element 30 can be measured in a conventional method. Via the NTC element 7 and/or 24 located in the temperature sensor 20 the temperature of the control element surface can be determined, which corresponds to the interior air temperature.

Either information still does not take the air circulation (arrow) in front of the control element 30 into consideration. This determination is made with the aid of heat element 5, 22 and the NTC 7, 24, and is based on the heat retention of the mass of the foil 3, 25 and the damping segment 8, 23, the materials of which are known. In a first adaptive measurement at the NTC element 7, 24, the reaction of no air circulation $L_{ruh}$ is measured and stored as a control value. This measurement can be determined during a factory installation of the sensor in a controlled environment (e.g. a no air flow environment). The measurement $L_{ruh}$ may also be determined whenever the vehicle operated and after a determination that there is no air flow, e.g., a determination is made whether or not a fan of a heating and air conditioning system of a vehicle is operational.

The heat element 5, 22 is then provided with short pulses $S_{normal}$ in relatively long time intervals, through which the NTC 7, 24 is heated. From the difference of the step response in comparison with the reaction adaptively determined with the sensor with no air circulation $L_{ruh}$, e.g., with the control value, air flow or no air flow is determined.

The damping of the impulse $S_{normal}$ transmitted via the impulse-damping segment 8, 23 thus provides information about the kind of air movement.

Figure 4:
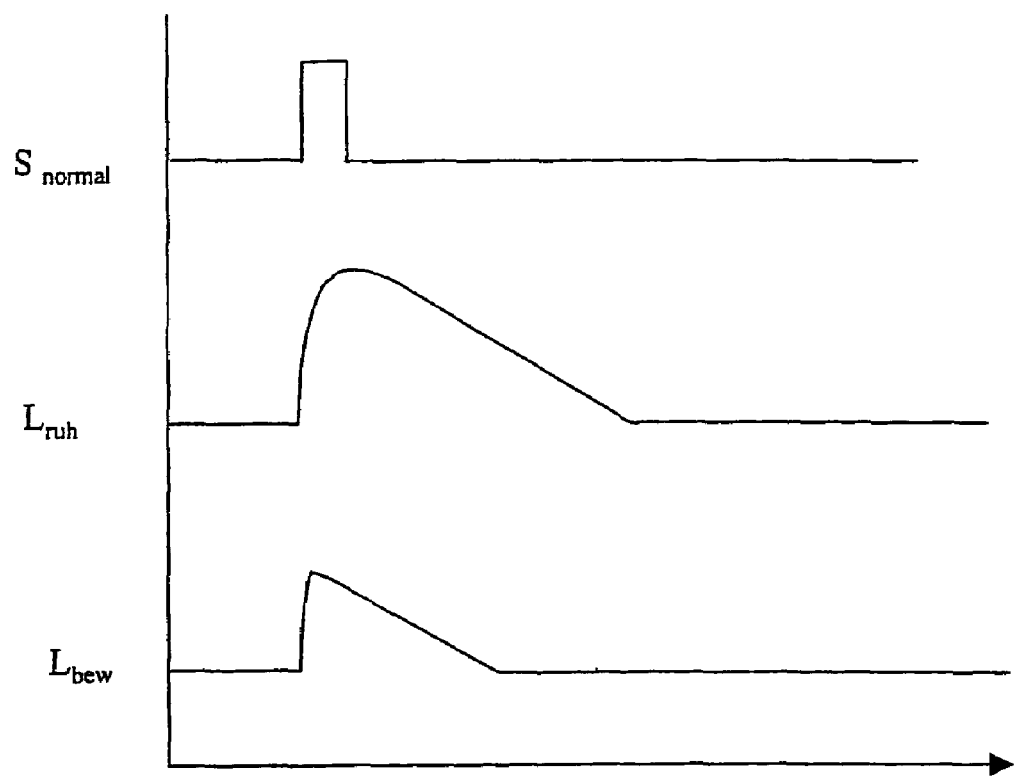
FIG. 4 is an impulse diagram to illustrate the impact of air circulation.

Experience has shown that depending on the air circulation, the step response at the NTC element 7, 24 varies because the heat information of the heat resistor 5, 22 is dampened by circulating air. The curve of no air circulation $L_{ruh}$ differs substantially from the curve of circulating air $L_{bew}$, namely, in differing impulse width and heights, as illustrated in FIG. 4.

The knowledge of whether there is air circulation or not leads to a weighting of incident sun radiation and thus, the weighting of the measured interior temperature. If the presence of air circulation $L_{bew}$ is determined, it follows that the incident sun radiation in the passenger area is higher than measured, whereby the measured value corresponds with the actual value of the interior temperature when no air circulation $L_{ruh}$ is present.

Continuing with the method, and taking into consideration the determined self-heating of the measuring area/control element 30, for example with the additional aid of a NTC 31 in control element 30, a correct interior temperature is determined with the help of the weighted values.

The weighted air circulation is thus entered as a correction value into the interference values "sun" and "self-heating of control element" and ultimately, into the control settings. Both values can be entered into the control either separately or weighted as individual values.

Figure 5:
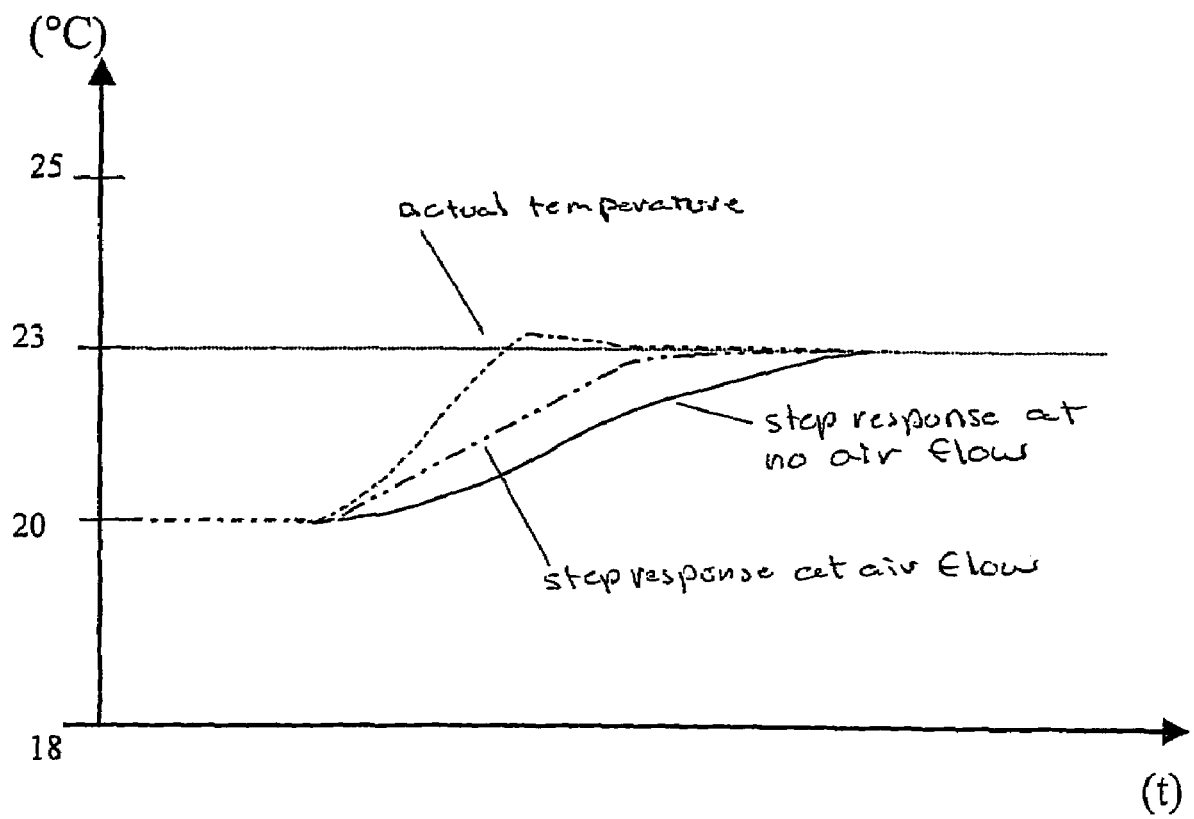
FIG. 5 is a diagram illustrating the skipping of the air temperature at a measuring area.

Due to the sluggishness of unventilated temperature sensors, substantial temperature changes in the passenger area can only be recorded with a time delay. The result of differing air flows on the sensor surface is a varying heat transmission resistance to the air in the passenger area. Substantial temperature changes are transmitted faster when air circulation is present than when there is none (FIG. 5).

The measured air circulation in front of the control element 30 (and/or the measuring area of the interior temperature in general) offers an additional advantage. By recording an actual time constant, temperature changes can be detected early, which makes a quick adjustment of the settings possible. In addition, with the aid of the step response, an expected final value can be calculated. This also allows a systematic adjustment of the temperature settings.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a temperature of an interior of a vehicle, the method comprising:
    measuring and storing a control value for a control element having a control element surface, the control value being representative of the temperature of the control element surface that is provided in the interior of the vehicle and measured with a temperature sensor when there is no air movement within the interior of the vehicle;
    providing a pulsed signal to a heat element of the control element through an impulse-damping segment of the control element so that the temperature sensor exhibits a temperature change;
    measuring a step response of the temperature sensor;
    comparing the step response of the temperature sensor with the control value to determine a damping amount of air flow on the heat element, wherein the damping amount comprises a change in temperature of the temperature sensor per a unit of time;
    comparing the determined damping amount to a predetermined damping amount value for a no air flow state of the heat element,
    determining a presence or absence of air flow in the interior of the vehicle on the basis of the comparison of the determined damping amount with the predetermined damping amount value;
    determining the temperature of the interior of the vehicle with a correction value based on the determination of the presence or absence of air flow and a temperature value from the temperature sensor; and
    providing the temperature of the interior of the vehicle to a vehicle system.

2. The method according to claim 1, further comprising adjusting a control of a heating and air-conditioning system of a vehicle on the basis of the determination of the temperature of the interior of the vehicle.

3. The method according to claim 1, wherein the vehicle system is a heating and air-conditioning system of the vehicle.

4. The method according to claim 3, further comprising weighting interference values for heating of the control element through incident sun radiation based on the determination of the presence or the absence of air flow in the interior of the vehicle.

5. The method according to claim 1, wherein the damping amount for a no air flow state comprises a change in temperature over a first period of time.

6. The method according to claim 5, wherein the damping amount for the presence of air flow in the interior of the vehicle comprises the change in temperature over a second period of time, wherein the second period of time is less than the first period of time.

7. The method according to claim 1, wherein the control element includes the temperature sensor, the temperature sensor comprising the heat element, the impulse-damping segment, and a foil.

8. The method according to claim 1, wherein measuring and storing the control value comprising determining the predetermined damping amount value during a no air flow state within the interior of the vehicle.

9. The method according to claim 1, wherein the temperature sensor comprises:
    at least one sensor for determining the surface temperature of a measuring area of the control element, and
    the heat element, which is thermally coupled with the at least one sensor.

10. The method according to claim 9, wherein the impulse-damping segment thermally couples the heat element with the at least one sensor.

11. The method according to claim 10, wherein the impulse-damping segment comprises a foil with conduction tracks attached thereto.

12. The method according to claim 9,
wherein the temperature sensor is located in a housing and is arranged in the upper part of a foil, which serves as a substrate for the temperature sensor, and into which are injected at least the sensor for determining the surface temperature of the measuring area and the heat element, and
wherein the housing is closed off towards the bottom with a casting compound, with contact pins leading through it.

13. The method according to claim 12, wherein the housing is made of infrared-permeable material, at least above an additional sensor for measuring the incident sun radiation, which is attached to the foil.

14. The method according to claim 11,
wherein the temperature sensor is located in a housing,
wherein the foil is flexible and is folded and inserted into the housing, together with the attached sensor for determining the surface temperature of the measuring area and the heat element, and
wherein foil tracks lead from the housing.

15. The method according to claim 14, wherein an additional sensor for determining the self-heating of the control element is attached to the foil in the housing, whereby the housing is open in this area.

16. The method according to claim 14, wherein a sensor measuring incident sun radiation is attached to the foil, and that the housing has an infrared-light permeable area around the sensor.

17. The method according to claim 16, wherein when the sensor is arranged below the foil, the foil is made of infrared-light permeable material in this area.

18. The method according to claim 1, wherein the temperature sensor is manufactured utilizing MID technology.

19. The method according to claim 1, wherein the temperature sensor is manufactured utilizing foil injection technology.

20. The method according to claim 1, wherein the heat element is a NTC.

* * * * *